UNITED STATES PATENT OFFICE.

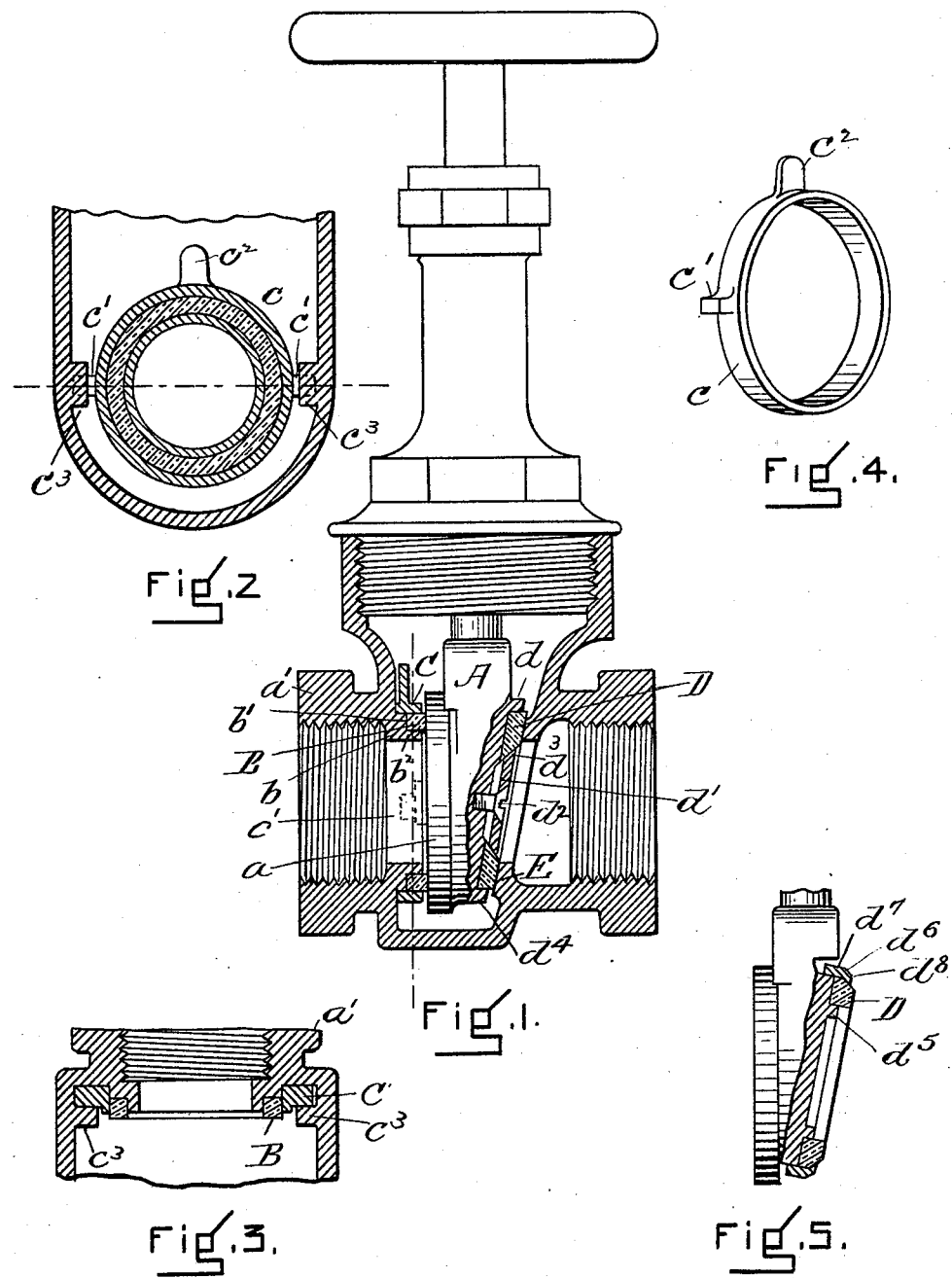

CHARLES JENKINS, OF BOSTON, MASSACHUSETTS.

STRAIGHTWAY VALVE.

SPECIFICATION forming part of Letters Patent No. 587,439, dated August 3, 1897.

Application filed March 24, 1894. Serial No. 504,924. (No model.)

*To all whom it may concern:*

Be it known that I, CHARLES JENKINS, a citizen of the United States, residing at Boston, in the county of Suffolk and State of Massachusetts, have invented a new and useful Improvement in Straightway Valves, of which the following is a full, clear, and exact description, reference being had to the accompanying drawings, forming a part of this specification, in explaining its nature.

My invention consists in the improved construction of the straightway valve herein described, having two seats, each of compressible or resilient packing, one of which is stationary and the other is carried by the gate, and in the ring device for attaching the compressible packing to the seat.

In the drawings, Figure 1 is a view, partly in elevation and partly in vertical section, of a straightway valve having the features of my invention. Fig. 2 is a view in section upon the dotted line of Fig. 1. Fig. 3 is a view in horizontal section upon the dotted line of Fig. 2. Figs. 4 and 5 are detail views to which reference will hereinafter be made.

The gate A may be operated in any of the usual ways to open and close the straightway passage $a$ in the valve-body $a'$. B is the stationary, resilient, or compressible seat. It is preferably in the form of a "Jenkins disk," so called, and it is preferably secured or attached to the diaphragm $b$ on the steam side of the gate to present its seat or surface to the gate. To receive this disk, the diaphragm preferably is provided with the recess $b'$ on the outer side of the wall $b^2$, and upon this wall the packing is slipped or placed, the wall acting to protect the inner edge of the packing or disk from the direct action of the steam.

An outer wall C is provided for the disk or packing by means of the removable metal ring $c$. This ring is of a size to receive the packing or disk and to slip upon the outer circular section of the diaphragm $b$. (See Fig. 1.) It is held in place by means of lugs $c'$, which project from the outer edge of the ring and are adapted to be turned by the turning projection $c^2$ as the ring is being placed upon the packing and the diaphragm behind the stationary ears $c^3$, projecting inward from the valve-body. (See Fig. 2.)

The disk or packing B projects slightly beyond the outer edge of the walls $b^2$ C, and the removable seat $a$ of the gate closes against it. The removable ring $c$ affords a means for protecting the outer edge of the disk or packing from the action of the steam, to reinforce it or hold it from being spread by the closing action of the seat $a$, and also as a means by which the packing or disk can be easily removed and another substituted, as by simply turning the ring enough to disengage the lugs $c'$ from the ears $c^3$ it may be removed entirely from the abutment and valve, thus exposing the disk in such a way that it can be easily pulled or removed from the shoulder and a new one substituted.

D is the compressible or resilient seat carried by the gate A and upon the outlet side of the valve. I have represented it in Fig. 1 as attached to the back of the gate within the recess $d$ by means of a washer $d'$ and screw $d^2$, the packing being held between the outer edge $d^3$ of the washer and the wall $d^4$, which in effect form a packing-holding recess, the packing projecting slightly beyond the outer edge of the wall and outer surface of the washer.

In Fig. 5 I have represented the packing or disk D as held to the gate in a somewhat different manner, the gate having the interior wall $d^5$, upon which the disk or packing D fits, and an outer wall $d^6$, formed by a removable ring $d^7$, which slides upon the gate and the outer edge $d^8$ of which may be slightly contracted to better hold the packing upon the gate. This packing is movable with the gate, and when the gate seats upon the main seat B it also comes to a seat upon the rear stationary seat E. (See Fig. 1.)

The advantages arising from this construction are, first, the freedom from rigidity of action obtained, the two compressible or resilient seats giving the gate opportunity to adjust itself to a perfect joint without undue strain or wear upon the parts; second, an effective double joint or seat is obtained, in each of which seats a resilient packing furnishes one of the members; third, each of the resilient or compressible seats is so placed as to be protected from the direct or impinging action of the passing steam, so that the wear upon them is decreased and their life correspondingly increased; fourth, the resilient or compressible seats are readily attached and removed, the seat D being of course removed from the valve with the gate.

It will be seen that the straightway valve above described has four seats, two of which are metal and two of compressible packing. These seats are arranged in pairs—that is, each metal seat seats upon a compressible seat, the advantage arising from this particular construction being that in the closing or seating of the valve there is not on either side of the valve a metallic contact between the seats of the valve and the stationary seats.

The metal seats of the valve once ground do not require to be reground, the wear of the valve being entirely or practically entirely upon the seats of compressible material, and the wear being thus placed permits the valve to be easily repaired or renewed at any time without regrinding by simply substituting for the worn-out compressible seats new seats.

I prefer for ease in construction and for obtaining a better wearing effect to locate one of the compressible seats in the valve-body and one upon the movable gate, and I prefer also that the one that is upon the gate shall be inclined. This produces in the valve itself one seat which is of compressible packing and which preferably is straight and another seat which is metallic and straight and which seats against the straight compressible seat of the valve, an inclined seat which is compressible and which seats against the inclined metallic seat of the valve. This relation of the metallic and the compressible seats is desirable also, because it affords ready means by which they can be removed, one from the valve-body, the other from the gate.

The value of a straightway valve having one compressible seat upon each side which is brought into direct contact with one ground-metal seat is of very considerable importance, in that it doubly packs the valve and in the most secure manner prevents the leakage of steam and in that it provides for compensation in the seating of the gate, otherwise not possible.

Another advantage of consequence obtained in the above-named construction is that both compressible seats are so located as to be protected from the direct or impinging action of the steam, as when the valve is closed the seat B is protected by the wall $b^2$ and the seat D by the metal part of the gate and the valve is open the steam passing through it is still protected by the wall $b^2$ from impinging upon the seat B, while the seat D has been withdrawn and is out of the line of the direct movement of the steam, the impinging force being then taken by the metal seat E.

Having thus fully described my invention, I claim and desire to secure by Letters Patent of the United States—

1. In a straightway valve, the combination of the valve-body having a narrow wall $b^2$ immediately about the steamway and a shoulder $b'$ extending outwardly from the base of said wall, a disk B of compressible packing of a size to fit over the said wall and against said shoulder and forming a stationary compressible valve-seat, and a metal ring C upon the exterior of said packing and said shoulder, means for securing the ring to the exterior of the shoulder, the oppositely-ground-metal seat E also surrounding the steamway, and the gate A having the ground-metal seat adapted to close upon the compressible seat B, and the oppositely-arranged compressible seat D detachably secured to the said gate and adapted to be brought into contact with the stationary ground-metal seat E, all as and for the purposes described.

2. The combination in a straightway valve of the wall $b^2$ surrounding the steamway, a shoulder $b'$ upon the outer side of said wall, a recess in the valve-body about said shoulder, a ring or disk of packing B to fit over said wall and bear upon said shoulder and a removable packing-holding ring C to fit over said ring or disk of packing and said shoulder having lugs and a turning ear $e^2$ and stationary ears $c^3$ upon the valve-body extending into the recess about the shoulder or wall and adapted to be engaged by the ears $c'$ upon the turning of the ring C, as and for the purposes described.

CHARLES JENKINS.

Witnesses:
F. F. RAYMOND, 2d,
J. M. DOLAN.